June 29, 1943.　　　　G. F. WIKLE　　　　2,323,174
APPARATUS FOR STACKING SHEET MATERIAL
Original Filed March 8, 1939　　3 Sheets-Sheet 1

INVENTOR.
GEORGE F. WIKLE
BY
ATTORNEY

June 29, 1943. G. F. WIKLE 2,323,174
APPARATUS FOR STACKING SHEET MATERIAL
Original Filed March 8, 1939 3 Sheets-Sheet 2

INVENTOR.
GEORGE F. WIKLE
ATTORNEY

June 29, 1943.   G. F. WIKLE   2,323,174
APPARATUS FOR STACKING SHEET MATERIAL
Original Filed March 8, 1939   3 Sheets-Sheet 3

INVENTOR.
GEORGE F. WIKLE
BY
ATTORNEY

Patented June 29, 1943

2,323,174

UNITED STATES PATENT OFFICE 2,323,174

APPARATUS FOR STACKING SHEET MATERIAL

George F. Wikle, Grosse Pointe, Mich., assignor to United States Rubber Company, New York, N. Y., a corporation of New Jersey Original application March 8, 1939, Serial No. 260,520. Divided and this application January 23, 1941, Serial No. 375,581

2 Claims. (Cl. 271—75)

This invention relates to an apparatus for stacking or piling sheet material and is a division of my Patent No. 2,278,602, issued April 7, 1942. In particular this invention relates to an apparatus for uniformly piling or stacking slabs of rubber stock or the like upon an automatically adjustable platform.

In the processing of rubber compositions for use in the manufacture of rubber articles such as pneumatic tires, it has been conventional practice to mix the rubber composition in a mixing mill and to cut and remove the rubber stock from the mill in the form of slabs of rubber. These slabs are manually removed from the mill and placed on hooks where they are allowed to cool and are coated with a lubricating material, after which they are piled on platforms in storage until needed for further processing. Heretofore all of these steps have been performed manually, and as the slabs of stock are relatively heavy and are hot, such manual tasks are hazardous and fatiguing.

In an endeavor to alleviate the foregoing objectionable conditions, I provide an apparatus which, in a continuous operation, receives an elongated strip of rubber composition from a mixing mill, carries the strip of rubber through various stages during which one surface of the strip is treated by the application of a lubricant and a cooling medium is applied to the opposite surface thereof, cuts the strip into pieces or slabs of uniform lengths, and automatically piles or places the cut lengths in superimposed relation upon a platform or truck skid. This invention is particularly directed to those portions of the apparatus which serve in piling or stacking these cut lengths of sheet material automatically upon a vertically adjustable platform or a conventional truck skid positioned thereon.

The invention will be more readily understood from the following detailed description when considered in connection with the accompanying drawings, in which.

Figure 1:
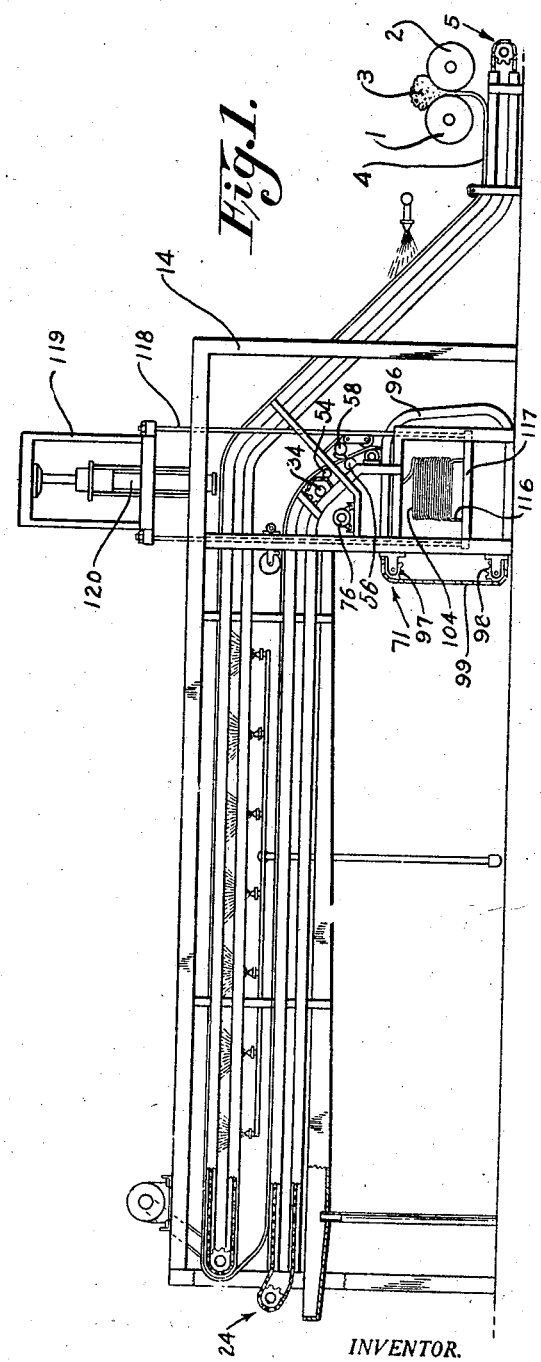
Fig. 1 is a side elevation of an apparatus for manipulating and preparing an elongated strip of rubber stock and for cutting and stacking pieces thereof automatically.

Referring to the drawings, and in particular to Fig. 1, I show a rubber stock treating apparatus associated with a conventional mixing mill illustrated diagrammatically by mill rolls 1 and 2. In accordance with conventional practice, a quantity of rubber stock 3 is placed in the bite of the mill rolls 1 and 2, and for a predetermined period of time the stock is mixed in such manner as to cause a uniform blending of the various ingredients which form the rubber composition. After the stock 3 is mixed for a predetermined period, an operator cuts the stock longitudinally of either of the rolls 1 and 2, and the free end of the stock which is rolled into the form of an elongated strip 4 drops by gravity onto a conveyor 5 which transports it to various treating and handling mechanisms described in my application Serial Number 260,520, referred to.

The conveyor 5 is supported on a frame 14 and moves continuously throughout the operation of the apparatus and carries the strip of stock 4 from the mixing mill along the length of the conveyor and transfers the strip from the end of the conveyor 5 to a secondary conveyor 24.

The secondary conveyor 24 is located directly below the conveyor 5 and functions to return the strip 4 a distance substantially equal to the elevated horizontal portion of the conveyor 5. The object of the horizontal travel of the stock along the conveyor 5 and back over conveyor 24 is to permit the mixed rubber stock to cool off sufficiently prior to the cutting and stacking of slabs of the rubber stock. It is essential to cool the stock as it has been found that stacking the pieces of stock into piles while hot causes a detrimental defect in the rubber composition.

At the drive end of the conveyor 24 and keyed to the shaft 34 a roller 50 (Fig. 2) is provided for supporting the wire mesh conveyor belt 32. Notches 51 are provided in the roller 50 to permit clearance for the structural angles 31 which support the belt 32.

During the cooling of the strip 4, water is sprayed over it, and a drain pan 52 is provided at the drive end of the conveyor 24 in order to collect any water that may drip from this portion of the conveyor. A drain line 53 removes the water from the pan 52.

Removal of the strip of stock 4 from the conveyor 24 is assisted by a roller 54 (Fig. 2) driven in any suitable manner, not shown and is keyed to a shaft 55 supported by bearings attached to the structural frame 14. From the driven roller 54 the strip passes on to a shearing device which cuts the strip into slabs or pieces 104. The shearing device includes a supporting roller 56 keyed to a shaft 57 mounted in bearings attached to the structural frame 14. The supporting roller 56 is driven in any suitable manner, not shown. Associated with the supporting roller 56 is a driven cutting roll 58 including a spiral blade 59 which cooperates with the supporting roller 56 to form a substantially transverse cut across the strip of rubber stock, thus severing the stock 4 into a plurality of pieces 104. The cutting roll 58 is keyed to a shaft 60 mounted in bearings 61 supported by rods 62 connected to the structural frame 14 in a manner to permit adjustment of the cutting roll 58 in the direction of the supporting roller 56.

To facilitate the cutting operation and to prevent the rubber stock from adhering to the supporting roller 56, means is provided for moistening the surface of the rubber stock during the cutting operation. This means includes a container 63 (Fig. 2) attached to the structural frame 14 and located in such a manner as to permit a portion of the supporting roller 56 to be partly submerged in water in the container 63. A conduit 64 joins the container 63 with the drain 53 whereby water collected in the pan 52 may pass through the drain 53 and conduit 64 into the container 63. The conduit 53 includes an elevated portion 65 which functions to maintain a definite water level in the container 63. Excess water leaves the elevated portion 65 of the drain 53 and is discharged into a drain 66.

From the cutting device the stock, as uniformly cut pieces or slabs 104, passes between driven rollers 67 and 68 keyed to shafts 69 and 70, respectively, which deposit the cut pieces of stock 104 on a stacking conveyor 71. The shaft 69 is mounted in bearings supported by the structural frame 14, and the shaft 70 is mounted in brackets 72 pivotally connected to the structural frame 14 at 73. The roller 67 is driven and a gear 74 keyed to the shaft 69 engages with a gear 75 keyed to the shaft 70, with the result that the roller 68 is driven in the opposite direction to that of the roller 67 to assist in removing the slabs of stock 104 from the cutting device and for depositing these slabs on the conveyor 71. While the roller 68 is pivotally mounted to the frame 14, its weight is sufficient to form proper contact between the gears 74 and 75 and for properly engaging the rubber stock.

The cutting operation is further facilitated by driving the rollers 67 and 68 slightly faster than the movement of the stock at the cutting operation. This differential stock movement stretches the stock slightly at the margin adjacent the knife blade 59.

The slab stacking apparatus or mechanism comprises an endless belt conveyor 71 moving in a substantially rectangular path, and arranged to pile or stack the slabs 104 within the conveyor. Essentially, the conveyor path is defined by a track 96 (Fig. 1) which forms three sides of the path, the remaining side of the path being occupied by the conveyor suspended between sprockets 97 and 98. Sprocket 97 is keyed to the shaft 92 mounted in bearings supported by the structural frame 14, and is driven continuously throughout the operation of the apparatus in synchronism with the conveyor 24 and cutting rolls 56, 58 by any suitable means, not shown. This rectangular conveyor 71 is of such size as to permit piling or stacking of a substantial quantity of slabs or pieces of rubber stock within the confines of the upper and lower reaches of the conveyor.

The sprocket 98, which is an idler sprocket, is mounted in bearings attached to the structural frame 14. Conveyor chains 99 engage the sprockets 97 and 98, and the track 96. The supporting part of the conveyor comprises a plurality of rollers 100 (Fig. 4) freely rotatable upon shafts 101 attached to links of the conveyor chains 99. Throughout the length of the conveyor 71 the rollers 100 are located in groups, each of which can receive and support a slab of stock thereon when the group of rollers is in a horizontal position at the upper part of the conveyor.

Figure 6:
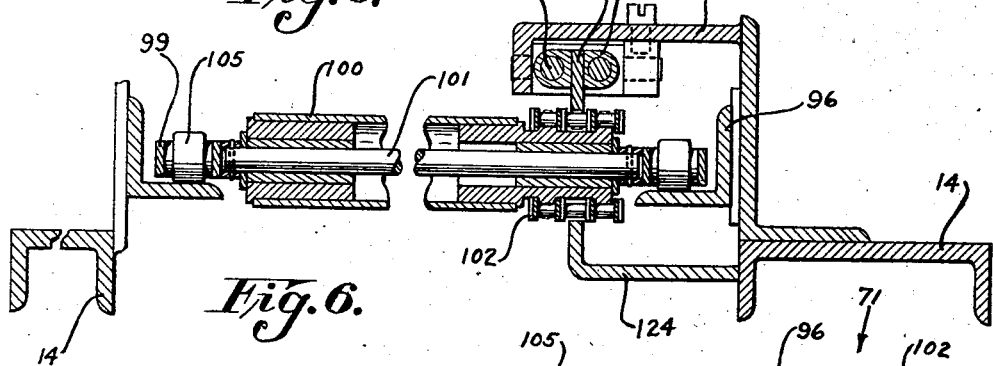
Fig. 6 is a detailed cross-sectional view of a slab stacking conveyor roller and associated structure, taken substantially along line VI—VI of Fig. 5; and, Fig. 7 is a diagrammatic view of a portion of the slab stacking mechanism, illustrating the relationship between the slab stacking conveyor and means for driving the conveyor rollers.

This grouping arrangement of the rollers 100 provides a gap between each successive group of a width sufficient to permit a slab of rubber to move from a supported position on a group of rollers through the gap between that group and the next successive group of rollers, and to a position within the conveyor. The rollers 100 in each group are connected together by a chain 102 meshing with sprockets 103 attached to each of the rollers 100. Because of the closeness of the rollers 100, it is necessary to stagger the sprockets 103 and provide a relatively wide chain 102, as shown best in Figs. 4 and 6.

The chain 99 is provided with rollers 105 which engage the track 96, and at the curved portions of the track guide brackets 106 (Fig. 2) are provided for maintaining the chains 102 in contact with the sprockets 103.

As the rubber slabs 104 are removed from the cutting operation each slab is laid on top of a group of the rollers 100. In the first stage of the operation the rollers 100 of a single group do not rotate about their respective axes, but merely serve as a moving table (Fig. 2) to carry the rubber stock along the upper path of the conveyor. When the group of rollers 100 has reached a position substantially above the stack of rubber slabs, means is provided to cause rotation of the rollers 100 rearwardly (or clockwise as viewed in Fig. 2) about their respective axes while they continue to move forwardly as a group along the conveyor path and this reverse rotation causes the rubber slab 104 to remain in a relatively stationary position while the group of rollers 100 moves out from beneath the slab. As the end of the slab of rubber extends over the gap between adjacent groups of rollers, the end of the rubber stock under the influence of gravity, drops through this gap or opening and onto the stack of slabs. The conveyor continues to move in its path, with the result that successive slabs of rubber stock are carried by and dropped from the rollers of successive groups and come to rest uniformly centered upon the stack of rubber slabs.

Figure 5:
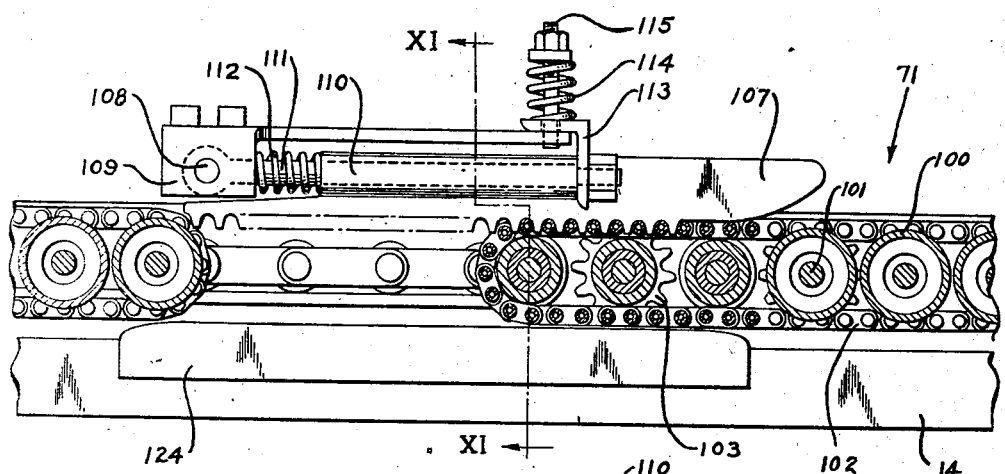
Fig. 5 is a transverse cross-sectional view of a portion of the slab stacking conveyor, taken substantially along line V—V of Fig. 4.
Figures 4, 7:
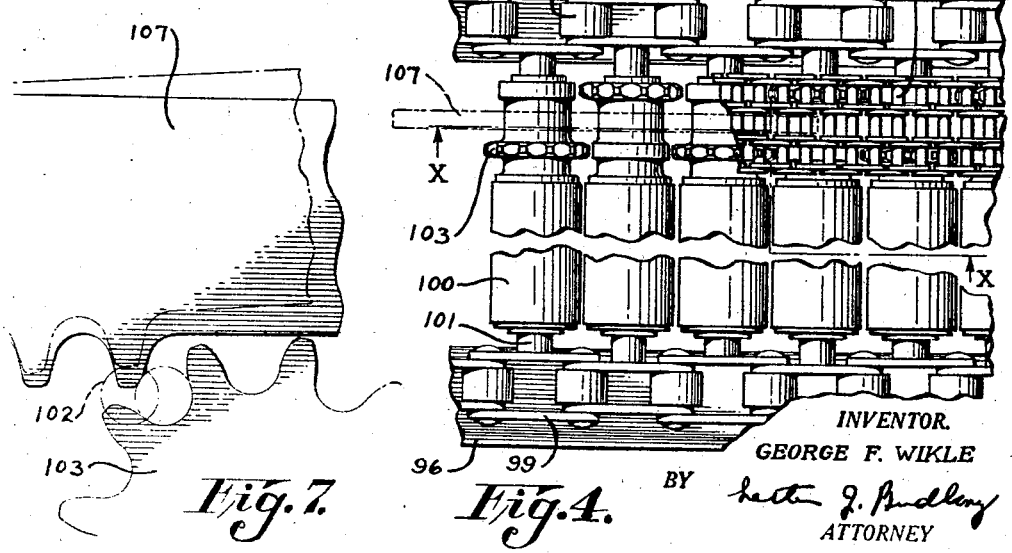
Fig. 4 is an enlarged detailed plan view of a portion of a conveyor for the slab stacking mechanism of this invention.

In order to rotate the rollers 100 rearwardly about their axes at the proper time, as indicated above, I provide a rack 107 (Fig. 5) which is engageable with the intermediate portion of the chain 102 for driving the rollers 100. A guide bar 124 is positioned below the chain 102 and opposite the rack 107 for assisting in maintaining the chain 102 in proper mesh relation with the rack 107. Except for a shock absorbing spring action, the rack 107 is substantially stationary. Its engagement with the chain 102 occurs as the chain is brought into engagement with the rack 107 due to the travel of the conveyor around its rectangular path. The rack 107 is pivotally supported at 108 from a bracket 109 attached to the structural frame 14. Sleeves 110 form a part of the rack 107 and engage rods 111 which are pivoted at 108 to the bracket 109. A spring 112 is interposed between the sleeves 110 and the bracket 109. By this arrangement a slight cushioning movement of the rack in a horizontal direction is permissible. A slight vertical cushioning movement is also provided by means of a bracket 113 secured to the rack 107 and cooperating through a spring 114 with a stud 115 attached to bracket 109. This cushioning movement of the rack 107, as shown in Fig. 7, is necessary because of the probability of improper meshing of the rack 107 with the chain 102 upon its first contact.

Figure 2:
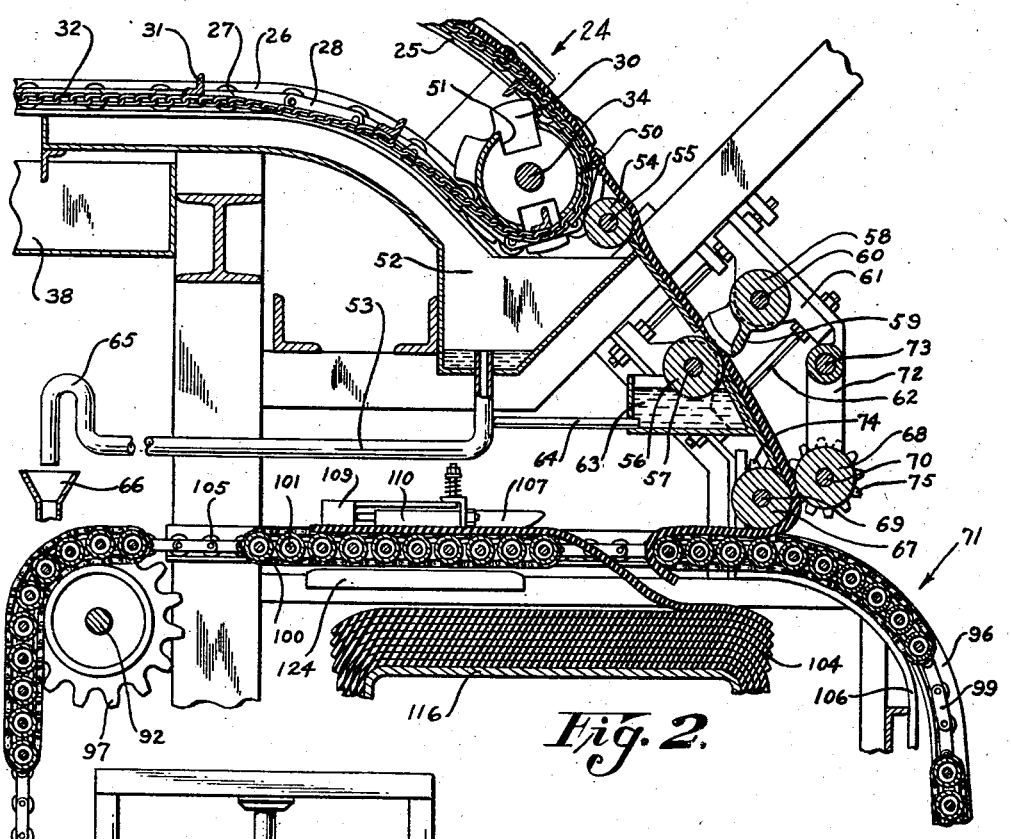
Fig. 2 is a vertical section of a portion of the apparatus, taken on a plane parallel to the plane of the paper in Fig. 1, on an enlarged scale.
Figure 3:
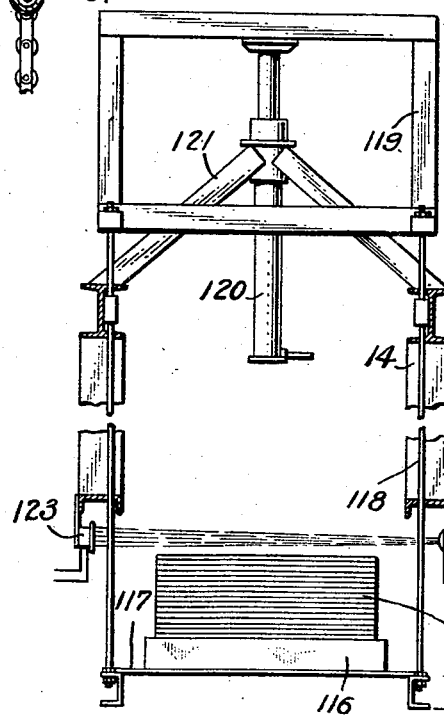
Fig. 3 is a diagrammatic elevational view, partly in section and partly broken away, of a device for supporting and controlling vertical movement of slabs of rubber stock being piled automatically by the apparatus.

I provide elevating means by which the deposited slabs may be lowered progressively from a uniform depositing position in order to accommodate a substantial quantity of slabs shown in Fig. 3. For purposes of convenience, the slabs of stock 104 are laid on a conventional truck skid 116 or other removable support. The truck skid in turn rests upon an elevator platform 117 which, through rods 118, is supported by a frame 119. A fluid operated cylinder 120 rigidly attached to the structural frame 14 by members 121 engages with the frame 119 for raising or lowering the elevator platform 117. It is preferable to maintain the top of the skid 116 or the top of the last deposited slab of stock 104 at a substantially uniform distance below the upper flight of the conveyor 71. A preferred relation is shown in Fig. 2. In order to maintain this distance throughout the depositing operation, I lower the elevator progressively through any suitable control actuated by an electric eye, comprising units 122 and 123 (Fig. 3) which may be connected with any conventional electric valve mechanism (not shown) for operating the fluid cylinder 120 when the valve mechanism is energized by the electric eye. When the elevator platform 117 is lowered to the end of its stroke, or when a sufficient quantity of rubber slabs are deposited on the truck skid 116, the apparatus may be stopped by an operator and the truck skid with the stack of rubber slabs removed by any conventional means. Another truck skid 116 may be replaced on the elevator platform 117 and the platform raised to its elevated position, and the apparatus is again ready for a similar cycle of operation.

It is to be understood that stock may be fed continuously to the mill rolls 1 and 2 for continuous operation of the apparatus, or the apparatus may be operated intermittently to accommodate a quantity of rubber stock 3 deposited in the bite of the mill rolls 1 and 2.

While I have thus shown and described the specific details of a preferred embodiment of my invention, it is to be understood that such details are not intended to be limitative of the invention except insofar as is set forth in the appended claims.

Having thus described my invention, what I claim and desire to protect by Letters Patent is:

1. A stacking device comprising an endless conveyor having vertically spaced upper and lower reaches, a portion of the upper reach being horizontally disposed for receiving slabs of rubber composition and for moving the slabs horizontally along with the conveyor, a slab receiving platform positioned between the upper and lower reaches of the conveyor, said conveyor including a plurality of rollers arranged in groups for supporting the slabs positioned upon the conveyor, the adjacent groups of rollers being separated from each other to form openings therebetween, means movably carried by each group and interconnecting the rollers thereof for simultaneous rotational movement, relatively stationary means operable upon said first named means at predetermined intervals for rotating the groups of rollers successively during movement of the conveyor, whereby the slabs carried by the groups of rollers are caused to drop successively through openings between successive groups when said rollers are rotated, said means interconnecting the rollers comprising one or more endless chains meshing with sprockets carried by the rollers, and said stationary means comprising a toothed member engageable with said endless chain or chains during operation of the conveyor.

2. A stacking device comprising an endless conveyor having vertically spaced upper and lower reaches, a portion of the upper reach being horizontally disposed for receiving slabs of rubber stock and for moving the slabs horizontally along with the conveyor, a slab receiving platform positioned between the upper and lower reaches of the conveyor, said conveyor including a plurality of rollers arranged in groups for supporting the slabs positioned upon the conveyor, the adjacent groups of rollers being separated from each other to form openings therebetween, means movably carried by each group and interconnecting the rollers thereof for simultaneous rotational movement, relatively stationary means positioned adjacent the horizontal portion of the upper reach and operable upon said first named means at predetermined intervals for rotating the groups of rollers successively during travel of the conveyor, whereby the slabs carried by the groups of rollers are caused to drop successively through openings between adjacent groups when said rollers are rotated, said first means comprising one or more endless chains operatively associated with sprockets positioned upon the rollers, the relatively stationary means comprising a toothed rack engageable with said endless chain or chains for operating said chain during movement of the conveyor, and means for automatically adjusting the elevation of the platform in accordance with the amount of stock positioned thereon so as to maintain the upper or slab receiving surface thereof at a substantially constant elevation.

GEORGE F. WIKLE.